(12) United States Patent
Ohba et al.

(10) Patent No.: US 6,432,489 B2
(45) Date of Patent: Aug. 13, 2002

(54) METHOD FOR CURING OPTICAL FIBER COATING MATERIAL

(75) Inventors: Toshio Ohba; Nobuo Kawada; Masaya Ueno, all of Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 09/805,979

(22) Filed: Mar. 15, 2001

(30) Foreign Application Priority Data

Mar. 15, 2000 (JP) .......................... 2000-072937

(51) Int. Cl.⁷ .................................. C08F 2/46
(52) U.S. Cl. .................... 427/496; 427/385.5; 427/551; 427/595
(58) Field of Search ................ 427/496, 551, 427/595, 385.5

(56) References Cited

U.S. PATENT DOCUMENTS

| | | |
|---|---|---|
| 4,581,407 A | 4/1986 | Schmid |
| 5,461,691 A | 10/1995 | Schunck et al. |

FOREIGN PATENT DOCUMENTS

| | | |
|---|---|---|
| EP | 0162471 | 11/1985 |
| EP | 1046619 A2 | 10/2000 |
| JP | 2119694 | 4/1989 |
| JP | 2522663 | 5/1996 |
| JP | 2541997 | 7/1996 |
| JP | 2547021 | 8/1996 |
| WO | WO9737951 | 10/1997 |
| WO | WO9841484 | 9/1998 |

*Primary Examiner*—Bernard Pianalto
(74) *Attorney, Agent, or Firm*—Birch, Stewart, Kolasch & Birch, LLP

(57) ABSTRACT

Methods for curing a coating material, including a primary coating material, a secondary coating material, and a taping material, on an optical fiber. An optical fiber coating material having (A) 100 parts by weight of a polyether polyurethane bearing at least two ethylenically unsaturated groups with a Mn of 800–10,000, and (B) 1–40 parts by weight of a nitrogenous reactive diluent is cured by irradiating thereto electron beams, produced by driving electrons under an accelerating voltage of 50–190 kV, in a dose of 10–100 kGy. The method succeeds in effectively curing the optical fiber coating material into a cured coating having stable properties.

11 Claims, No Drawings

METHOD FOR CURING OPTICAL FIBER COATING MATERIAL

This invention relates to a method for curing coating materials on optical fibers, including primary and secondary coating materials and taping materials, with electron beams.

BACKGROUND OF THE INVENTION

Optical communications fibers include a variety of types such as quartz glass, multi-component glass and plastic fibers. In reality, quartz glass fibers are vastly used in a wide variety of applications because of their light weight, low loss, high durability and high transmission capacity. Since quartz glass fibers are very thin and sensitive to external factors, quartz glass fibers for optical communications are generally of the construction that a quartz glass fiber which is spun from a melt is coated with a liquid curable resin capable of curing to a soft state, the coating is cured to form a primary coating, and the primary coating is protected with a secondary coating using a liquid curable resin capable of curing to a hard state. This is generally designated a coated optical fiber or simply optical fiber. A tape element is fabricated by bundling several, typically four, coated optical fibers and coating the bundle with a taping material, followed by curing.

Typical of the coating material are urethane acrylate base ultraviolet-curable resin compositions. As disclosed in JP-B 1-19694 and Japanese Patent Nos. 2,522,663 and 2,547,021, liquid UV-curable resin compositions comprising a urethane acrylate oligomer, a reactive diluent, and a photopolymerization initiator are known. To meet the recent demand for increasing the drawing speed of optical fibers for productivity improvement purposes, the UV curing system can find no solution other than the use of an increased number of UV lamps. This has a limit when curing is effected in a limited space. Japanese Patent No. 2,541,997 discloses electron radiation as exemplary actinic energy radiation, but does not refer to electron beam accelerating voltages. If electron beams accelerated at high voltage as used in the prior art are irradiated to optical fibers, the dopant which is added to the optical fiber core in order to provide an increased refractive index can be altered or blackened, resulting in an undesirably increased transmission loss.

SUMMARY OF THE INVENTION

An object of the invention is to provide a method for curing an optical fiber coating material with electron beams in an efficient manner to form a cured coating having improved properties.

The inventors have found that by irradiating a specific coating material on an optical fiber with electron beams, obtained by driving electrons under an accelerating voltage of 50 to 190 kV, in a low dose of 10 to 100 kGy, the coating material can be effectively cured without increasing the transmission loss of the optical fiber.

It has also been found that since the dose of electron beams is determined by the current flow through the filament and the processing speed, it is possible to keep a constant dose by controlling the current flow in proportion to the drawing speed.

In general, electron beams are produced by conducting electric current through a filament to heat the filament for emitting thermal electrons, and accelerating the thermal electrons under the impetus of a voltage (accelerating voltage) to form electron beams. The accelerating voltage affects the penetration depth of electrons when irradiated to the optical fibers. If the accelerating voltage is too low, only a surface layer of the resin coating is cured. Since electron beams have great energy, a greater dose can cause crosslinking at radical polymerizable functional groups and anywhere. In order to provide cured coatings with consistent properties, not only the electron accelerating voltage, but also the dose of electron beams must be controlled. It has been found effective that a composition comprising a polyether polyurethane bearing at least two ethylenically unsaturated groups in a molecule and having a number average molecular weight of 800 to 10,000 and a nitrogenous reactive diluent is used as an optical fiber coating material and this coating material is cured with electron beams under the above-specified conditions of accelerating voltage and dose.

Accordingly, the invention provides a method for curing an optical fiber coating material comprising (A) 100 parts by weight of a polyether polyurethane bearing at least two ethylenically unsaturated groups in a molecule and having a number average molecular weight of 800 to 10,000, and (B) 1 to 40 parts by weight of a nitrogenous reactive diluent, the method comprising the step of irradiating the coating material with electron beams, produced by accelerating electrons under a voltage of 50 to 190 kV, in a dose of 10 to 100 kGy.

DESCRIPTION OF THE PREFERRED EMBODIMENT

The method for curing an optical fiber coating material according to the invention is characterized in that an optical fiber coating material comprising (A) a polyether polyurethane bearing at least two ethylenically unsaturated groups in a molecule and having a number average molecular weight of 800 to 10,000 and (B) a nitrogenous reactive diluent is irradiated with electron beams, produced by accelerating electrons under a voltage of 50 to 190 kV, in a dose of 10 to 100 kGy.

Component (A) is a polyether polyurethane bearing at least two ethylenically unsaturated groups in a molecule and having a number average molecular weight (Mn) of 800 to 10,000. With Mn of less than 800, the cured coating loses elongation. With Mn of more than 10,000, the cure by electron beam irradiation becomes ineffective.

The optical fiber coating material is applicable as a primary coating material, secondary coating material and taping material. Of these optical fiber coating materials, the primary coating material is a liquid curable resin to form a soft cured coating. For the primary coating material, the polyether polyurethane bearing at least two ethylenically unsaturated groups in a molecule should preferably have a number average molecular weight of 2,500 to 10,000 because a longer distance must be set between crosslinks. The secondary coating material for protecting the primary coating is a liquid curable resin to form a hard cured coating. For the secondary coating material, the polyether polyurethane bearing at least two ethylenically unsaturated groups in a molecule should preferably have a number average molecular weight of 800 to 3,500 because a relatively short distance must be set between crosslinks. For the taping material, the polyether polyurethane bearing at least two ethylenically unsaturated groups in a molecule should preferably have a number average molecular weight of 800 to 2,500.

The polyether polyurethane bearing at least two ethylenically unsaturated groups in a molecule is obtained, for example, by reacting a diol having an oxyalkylene group of 2 to 10 carbon atoms with a diisocyanate and a compound having an ethylenically unsaturated group.

Illustrative examples of the diol having an oxy-alkylene group of 2 to 10 carbon atoms include polyethylene glycol, polypropylene glycol, polytetramethylene glycol, 2-methyltetrahydrofuran glycol, 3-methyltetrahydrofuran glycol, polyheptamethylene glycol, polyhexamethylene glycol, polydecamethylene glycol, and polyalkylene oxide-added diols of bisphenol A. From the moisture absorption and viscosity standpoints, polypropylene glycol, polytetramethylene glycol, 2-methyltetrahydrofuran glycol, and 3-methyltetrahydrofuran glycol are preferable. The polyalkylene oxides used herein include homopolymers as well as random and block copolymers thereof.

Examples of the diisocyanate used herein include 2,4-tolylene diisocyanate, 2,6-tolylene diisocyanate, 1,3-xylene diisocyanate, 1,4-xylene diisocyanate, 1,5-naphthalene diisocyanate, m-phenylene diisocyanate, p-phenylene diisocyanate, hexamethylene diisocyanate, isophorone diisocyanate, 2,2,4-trimethylhexamethylene diisocyanate, and 2,4,4-trimethylhexamethylene diisocyanate. Of these, 2,4-tolylene diisocyanate and isophorone diisocyanate are preferred. These diisocyanates may be used alone or in admixture of two or more.

Examples of the compound having an ethylenically unsaturated group include (meth)acrylic compounds having a hydroxyl, acid halide and epoxy group. Exemplary (meth) acrylic compounds having a hydroxyl group are 2-hydroxyethyl (meth)acrylate, 2-hydroxypropyl (meth) acrylate, pentaerythritol tri(meth)acrylate, and glycerin di(meth)acrylate, as well as alkyl glycidyl ethers and addition products of glycidyl group-containing compounds and (meth)acrylic acid such as glycidyl (meth)acrylate. Exemplary (meth)acrylic compounds having acid halide are (meth)acrylic chloride and (meth)acrylic bromide. Exemplary (meth)acrylic compounds having an epoxy group are the glycidyl esters of (meth)acrylic acid.

The polyether polyurethane bearing at least two ethylenically unsaturated groups in a molecule is prepared, for example, by first reacting the diol with the diisocyanate in a customary way in a molar ratio OH/NCO of from 0.5 to 2.0, and further reacting with the compound having an ethylenically unsaturated group.

The nitrogenous reactive diluent (B) is effective for reducing the viscosity of the polyether polyurethane (A) and promoting reaction thereof upon exposure to electron beams.

Illustrative examples of the nitrogenous reactive diluent include N-vinylpyrrolidone, N-vinylcaprolactam, N-vinylacetamide, N-vinylformamide, and N,N'-divinylethylene urea, which may be used alone or in admixture of any. Of these, N-vinylcaprolactam is preferred because the water resistance of cured coating is little affected.

An appropriate amount of the nitrogenous reactive diluent blended is about 1 to 40 parts, and desirably about 5 to 20 parts by weight per 100 parts by weight of the polyether polyurethane (A). Less than 1 part of the nitrogenous reactive diluent fails to exert the effects of reducing the viscosity of the polyether polyurethane and promoting reaction thereof upon exposure to electron beams. More than 40 parts of the nitrogenous reactive diluent can adversely affect the water resistance of cured coating.

In preferred embodiments, (C) a nitrogen-free reactive diluent is blended for the purpose of viscosity adjustment.

In the case of primary coating material which has to maintain softness at low temperatures, the nitrogen-free reactive diluent is preferably one whose homopolymer has a glass transition temperature (Tg) of up to $-20°$ C. Illustrative examples of the nitrogen-free reactive diluent whose homopolymer's Tg is below $-20°$ C. include n-lauryl acrylate, 2-ethylhexyl acrylate, n-hexyl acrylate, isooctyl acrylate, nonylphenoxypolyethylene glycol acrylate, 2-phenoxyethyl acrylate, and 2-ethoxyethyl acrylate.

In the case of secondary coating and taping materials which have to maintain hardness at high temperatures, the nitrogen-free reactive diluent is preferably one whose homopolymer has a Tg of at least $50°$ C. Illustrative examples of the nitrogen-free reactive diluent whose homopolymer's Tg is at least $50°$ C. include isobornyl acrylate, tetrahydrofurfuryl acrylate, dicyclopentenyl acrylate, tripropylene glycol diacrylate, neopentyl glycol diacrylate, and trimethylol propane triacrylate.

An appropriate amount of the nitrogen-free reactive diluent blended is about 1 to 100 parts, and desirably about 5 to 50 parts by weight per 100 parts by weight of the polyether polyurethane (A). Less than 1 part of the nitrogen-free reactive diluent may fail to exert the viscosity reducing effect. More than 100 parts of the nitrogen-free reactive diluent can adversely affect the cure and result in cured coatings having a reduced elongation.

In general, an optical fiber tape is manufactured as follow. First of all, primary and secondary coating materials are consecutively coated and cured to bare optical fibers to form (coated) optical fibers. A plurality of, typically four or eight, optical fibers are bundled, and a taping material is coated and cured to the bundle of optical fibers for integration, yielding an optical fiber tape. Since the requirements for the tape are similar to the requirements for the secondary coating material, the type and amount of the polyether polyurethane, nitrogenous reactive diluent and nitrogen-free reactive diluent used in the taping material may be the same as in the secondary coating material.

If desired, various additives such as polymerization initiators, sensitizers, antioxidants, UV absorbers, organic solvents, plasticizers, surfactants, silane coupling agents, coloring pigments, and organic or inorganic particles may be added to the optical fiber coating materials according to the invention insofar as the objects of the invention are not impaired.

The optical fiber coating material can be prepared by formulating the above-described components, agitating and mixing. In connection with working efficiency, the coating material desirably has a viscosity of about 500 to 10,000 centipoise at $25°$ C. for compatibility with manufacturing conditions of optical fibers and especially about 1,000 to 6,000 centipoise at $25°$ C. for compatibility with high speed manufacturing conditions.

The coating material obtained by admixing the above-described components is applied onto an optical fiber to a thickness of several tens to several hundreds of microns by a die coating or similar coating technique. Electrons are accelerated under a voltage of 50 to 190 kV to produce electron beams, which are irradiated to the resin coating in a dose of 10 to 100 kGy, preferably 20 to 50 kGy, thereby effectively curing the resin without any detrimental influence on the transmission loss and other characteristics of the optical fiber. With an accelerating voltage below 50 kV, the resin coating is not fully cured to the depth. With an accelerating voltage above 190 kV, the characteristics of the optical fiber can be degraded. In a dose of less than 10 kGy, the resin coating is undercured. In a dose of more than 100 kGy, reaction can occur at the ethylenically functional groups and anywhere, failing to provide the desired characteristics.

The primary and secondary coating materials each are generally coated onto bare optical fibers to a thickness of about 20 to 60 μm. Where the primary and secondary coatings are cured by irradiating electron beams thereto, preferably electron beams, produced under an accelerating voltage of 50 to 120 kV, are irradiated so as to give a dose of 10 to 100 kGy. With an accelerating voltage below 50 kV, the resin coating is not fully cured to the depth. With an accelerating voltage above 120 kV, the characteristics of the optical fiber can be degraded.

The taping material is generally coated to a greater thickness of about 300 to 400 μm. Where the tape coating is cured by irradiating electron beams thereto, preferably electron beams, produced under an accelerating voltage of 120 to 190 kV, are irradiated so as to give a dose of 10 to 100 kGy. With an accelerating voltage below 120 kV, the resin coating is not fully cured to the depth. With an accelerating voltage above 190 kV, the characteristics of the optical fiber can be degraded.

Where the optical fiber coating material is used as the primary coating material, it is directly coated onto an optical glass fiber and cured to form a primary coating. For protecting the underlying optical fiber from micro-bends induced by external forces and temperature changes, the primary coating material in the cured state should desirably have a Young's modulus of up to 5 MPa. The secondary coating material overlying the primary coating for mechanically protecting the optical fiber and the taping material for binding a bundle of coated optical fibers should desirably have a Young's modulus of at least 30 MPa.

From the standpoint of age stability, the cured coatings of the primary and secondary coating materials and taping material should desirably have a gel fraction of at least 90%.

EXAMPLE

Examples of the invention are given below by way of illustration and not by way of limitation. All parts are by weight.

Example 1

A reactor was charged with 106.8 g of nonylphenol polyethoxylate acrylate Aronix M-113 (Toagosei Co., Ltd., 4 mol EO-modified acrylate polymer), 17.3 g of 2,4-tolylene diisocyanate, 0.5 g of dibutyltin dilaurate, and 0.15 g of 2,6-di-tert-butylhydroxytoluene. In dry air, 11.3 g of 2-hydroxyethyl acrylate was added dropwise at such a rate as to keep the solution below 15° C. After 2 hours of reaction at 30° C., 398 g of polypropylene glycol having a number average molecular weight of 7,950 was added to the solution.

Reaction was effected at 50 to 60° C. for 3 hours, yielding an acrylic urethane oligomer containing 20% by weight of Aronix M-113 (designated Oligomer A).

A primary coating material was prepared by admixing 125 parts of Oligomer A, 8.3 parts of Aronix M-113, 16.6 parts of lauryl acrylate and 16.6 parts of N-vinylcaprolactam. It had a viscosity of 4,500 mPa-s at 25° C.

Using an applicator, the primary coating material was coated onto a glass plate to a thickness of about 60 μm. Electrons were accelerated under a voltage of 100 kV to produce electron beams, which were irradiated to the coating in a dose of 30 kGy, obtaining a cured film. The curd film was examined by the following tests. The test results are shown in Table 1, indicating that the cured film fully satisfies the requirements as the optical fiber primary coating material.

Evaluation of Coating Properties
(1) Gel Fraction

The cured film was immersed in acetone for 16 hours, taken out, dried at 70° C. for 4 hours, and weighed. A weight loss was computed according to the following equation.

Gel Fraction=(weight of dry film)/weight of initial film)×100%

(2) Young's Modulus

The cured film was conditioned at 25° C. and RH 50% for 24 hours before a 2.5% tensile modulus (Young's modulus) was measured at a gage mark distance of 25 mm and a pulling rate of 1 mm/min.

(3) Tensile Strength and Elongation at Rupture

The cured film was conditioned at 25° C. and RH 50% for 24 hours before measurement was made at a gage mark distance of 25 mm and a pulling rate of 50 mm/min.

Example 2

A reactor was charged with a mixture of 51.5 g of 2,4-tolylene diisocyanate, 42.3 g of polytetramethylene ether glycol having a number average molecular weight of 2,000, 22.0 g of polyoxypropylene glycol having a number average molecular weight of 400, and 1.6 g of trioxypropylene glycol. In a nitrogen atmosphere, reaction was effected at 70 to 80° C. for 3 hours. The reaction mixture was cooled to 40° C., the reactor was purged with dry air, and 50.0 g of 2-hydroxyethyl acrylate was added. The reactor was slowly heated to a temperature of 60 to 70° C., at which reaction was effected for 2 hours. With 0.1 g of dibutyltin dilaurate added, reaction was effected for a further 4 hours, yielding an acrylic urethane oligomer (designated Oligomer B).

A secondary coating material was prepared by admixing 100 parts of Oligomer B, 14.3 parts of isobornyl acrylate, 14.3 parts of N-vinylcaprolactam and 14.3 parts of tricyclodecanedimethanol diacrylate. It had a viscosity of 3,900 mPa-s at 25° C.

As in Example 1, the secondary coating material was coated and cured with electron beams before the properties of the cured film were examined. The test results are shown in Table 1, indicating that the cured film fully satisfies the requirements as the optical fiber secondary coating material.

Example 3

A reactor was charged with 400 g of polytetramethylene ether glycol having a number average molecular weight of 2,000 and 52.3 g of 2,4-tolylene diisocyanate. In a nitrogen atmosphere, reaction was effected at 70 to 80° C. for 150 minutes. The reaction mixture was cooled to 40° C., and the reactor was purged with dry air. There were added 0.14 g of 2,6-di-tert-butylhydroxytoluene, 0.09 g of dibutyltin dilaurate and 23.7 g of 2-hydroxyethyl acrylate. Reaction was effected at 60 to 70° C. for 3 hours, yielding an acrylic urethane oligomer (designated Oligomer C).

A taping material was prepared by admixing 100 parts of Oligomer C, 20 parts of N-vinylcaprolactam, 50 parts of isobornyl acrylate, and 30 parts of dicyclopentenyl acrylate. It had a viscosity of 5,400 mPa-s at 25° C.

The taping material was coated onto a glass plate to a thickness of about 200 μm. Electrons were accelerated under a voltage of 175 kV to produce electron beams, which were irradiated to the coating in a dose of 100 kGy, obtaining a cured film. The curd film was examined as in Example 1. The test results are shown in Table 1, indicating that the cured film fully satisfies the requirements as the optical fiber taping material.

Comparative Example 1

A primary coating material was prepared by admixing 125 parts of Oligomer A in Example 1, 8.3 parts of Aronix M-113, and 33.3 parts of lauryl acrylate. It had a viscosity of 4,700 mPa-s at 25° C.

The primary coating material was coated and cured with electron beams as in Example 1, obtaining a cured film. The test results on this cured film are shown in Table 1. The film had a too low gel fraction to measure Young's modulus and other properties and did not satisfy the requirements as the optical fiber coating material.

Comparative Example 2

The primary coating material prepared in Example 1 was coated and cured with electron beams as in Example 1 except that the dose was changed to 300 kGy, obtaining a cured film. The test results on this cured film are shown in Table 1. The film had an improved gel fraction, but a high Young's modulus and a reduced elongation. It was inadequate as the optical fiber primary coating material.

Comparative Example 3

The taping material prepared in Example 3 was coated and cured with electron beams as in Example 3 except that the accelerating voltage was changed to 40 kV. Only the surface cured and the interior remained uncured. The test results are shown in Table 1. The film had a too low gel fraction to measure physical properties and was unsatisfactory as the optical fiber taping material.

TABLE 1

| Item | E1 | E2 | E3 | CE1 | CE2 | CE3 |
|---|---|---|---|---|---|---|
| Accelerating voltage (kV) | 100 | 100 | 175 | 100 | 100 | 40 |
| Dose (kGy) | 30 | 30 | 100 | 30 | 300 | 100 |
| Gel fraction (%) | 95 | 98 | 96 | 70 | 98 | 18 |
| Young's modulus (MPa) | 2 | 1000 | 1200 | — | 20 | — |
| Elongation at rupture (%) | 185 | 50 | 40 | — | 50 | — |
| Tensile strength (MPa) | 2 | 43 | 50 | — | 10 | — |

The inventive method succeeds in effectively curing optical fiber coating materials into cured coatings having stable properties.

Japanese Patent Application No. 2000-072937 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for curing a coating material on an optical fiber, said coating material comprising (A) 100 parts by weight of a polyether polyurethane bearing at least two ethylenically unsaturated groups in a molecule and having a number average molecular weight of 800 to 10,000, and (B) 1 to 40 parts by weight of a nitrogenous reactive diluent, said method comprising the step of irradiating the coating material with electron beams produced by accelerating electrons under a voltage of 50 to 190 kV, in a dose of 10 to 100 kGy.

2. The method for curing a coating material on an optical fiber according to claim 1, wherein said polyether polyurethane bearing at least two ethylenically unsaturated groups (A) is obtained by reacting a diol having an oxyalkylene group of 2 to 10 carbon atoms with a diisocyanate and a compound having an ethylenically unsaturated group.

3. The method for curing a coating material on an optical fiber according to claim 1, wherein said nitrogenous reactive diluent (B) is at least one nitrogenous reactive diluent selected from the group consisting of N-vinylpyrrolidone, N-vinylcaprolactam, N-vinylacetamide, N-vinylformamide, and N,N'-divinylethylene urea.

4. The method for curing a coating material on an optical fiber according to claim 1, wherein said coating material comprises an additive.

5. The method for curing a coating material on an optical fiber according to claim 1, wherein said dose is 20 to 50 kGy.

6. A method for curing a primary coating material on an optical fiber, said primary coating material comprising (A) 100 parts by weight of a polyether polyurethane bearing at least two ethylenically unsaturated groups in a molecule and having a number average molecular weight of 2,500 to 10,000, (B) 1 to 40 parts by weight of a nitrogenous reactive diluent, and (C) 1 to 100 parts by weight of a nitrogen-free reactive diluent whose homopolymer has a glass transition temperature of up to −20° C., said method comprising the step of irradiating the coating material with electron beams produced by accelerating electrons under a voltage of 50 to 120 kV, in a dose of 10 to 100 kGy.

7. The method for curing a primary coating material on an optical fiber according to claim 6, wherein said nitrogen-free reactive diluent (C) is selected from the group consisting of n-lauryl acrylate, 2-ethylhexyl acrylate, n-hexyl acrylate, isooctyl acrylate, nonylphenoxypolyethylene glycol acrylate, 2-phenoxyethyl acrylate and 2-ethoxyethyl acrylate.

8. A method for curing a taping material on an optical fiber, said taping material comprising (A) 100 parts by weight of a polyether polyurethane bearing at least two ethylenically unsaturated groups in a molecule and having a number average molecular weight of 800 to 2,500, (B) 1 to 40 parts by weight of a nitrogenous reactive diluent, and (C) 1 to 100 parts by weight of a nitrogen-free reactive diluent whose homopolymer has a glass transition temperature of at least 50° C., said method comprising the step of irradiating the coating material with electron beams produced by accelerating electrons under a voltage of 150 to 190 kV, in a dose of 10 to 100 kGy.

9. The method for curing a taping material on an optical fiber according to claim 8, wherein said nitrogen-free reactive diluent (C) is selected from the group consisting of isobornyl acrylate, tetrahydrofurfuryl acrylate, dicyclopentenyl acrylate, tripropylene glycol diacrylate, neopentyl glycol diacrylate and trimethylol propane triacrylate.

10. A method for curing a secondary coating material on an optical fiber, said secondary coating material comprising (A) 100 parts by weight of a polyether polyurethane bearing at least two ethylenically unsaturated groups in a molecule and having a number average molecular weight of 800 to 3,500, (B) 1 to 40 parts by weight of a nitrogenous reactive diluent, and (C) 1 to 100 parts by weight of a nitrogen-free reactive diluent whose homopolymer has a glass transition temperature of at least 50° C., said method comprising the step of irradiating the coating material with electron beams produced by accelerating electrons under a voltage of 50 to 120 kV, in a dose of 10 to 100 kGy.

11. The method for curing a secondary coating material on an optical fiber according to claim 10, wherein said nitrogen-free reactive diluent (C) is selected from the group consisting of isobornyl acrylate, tetrahydrofurfuryl acrylate, dicyclopentenyl acrylate, tripropylene glycol diacrylate, neopentyl glycol diacrylate and trimethylol propane triacrylate.

* * * * *